United States Patent
Liu et al.

(10) Patent No.: US 9,081,964 B2
(45) Date of Patent: Jul. 14, 2015

(54) FIRMWARE UPGRADE ERROR DETECTION AND AUTOMATIC ROLLBACK

(71) Applicant: General Electric Company, Schenectady, NY (US)

(72) Inventors: Zhan Liu, Johns Creek, GA (US); Bin Zhang, Suwanee, GA (US); Bruce Robert Ladeau, Hampton, NH (US)

(73) Assignee: General Electric Company, Schenectady, NY (US)

( * ) Notice: Subject to any disclaimer, the term of this patent is extended or adjusted under 35 U.S.C. 154(b) by 270 days.

(21) Appl. No.: 13/728,365

(22) Filed: Dec. 27, 2012

(65) Prior Publication Data
US 2014/0189335 A1  Jul. 3, 2014

(51) Int. Cl.
G06F 9/44 (2006.01)
G06F 21/57 (2013.01)
G01D 4/00 (2006.01)
G06F 11/07 (2006.01)
G06F 11/14 (2006.01)

(52) U.S. Cl.
CPC .............. *G06F 21/572* (2013.01); *G01D 4/002* (2013.01); *G06F 11/0793* (2013.01); *G06F 11/1433* (2013.01); *G06F 11/1417* (2013.01); *Y02B 90/241* (2013.01); *Y02B 90/246* (2013.01); *Y04S 20/32* (2013.01); *Y04S 20/42* (2013.01)

(58) Field of Classification Search
None
See application file for complete search history.

(56) References Cited

U.S. PATENT DOCUMENTS

| 6,282,675 | B1 | 8/2001 | Sun et al. |
| 7,073,053 | B1 | 7/2006 | Oz et al. |
| 8,281,116 | B2 | 10/2012 | Rothman et al. |
| 2002/0194527 | A1 | 12/2002 | Murai et al. |
| 2006/0242280 | A1* | 10/2006 | Zimmer et al. ............... 709/222 |
| 2012/0066291 | A1* | 3/2012 | Grigorov et al. .............. 709/203 |
| 2012/0239981 | A1 | 9/2012 | Franke et al. |
| 2012/0257248 | A1 | 10/2012 | Sato |
| 2012/0291021 | A1 | 11/2012 | Banerjee et al. |

FOREIGN PATENT DOCUMENTS

| EP | 1840820 A1 | 10/2007 |
| WO | 2004086168 | 10/2004 |
| WO | 2008125634 | 10/2008 |
| WO | 2009089408 | 7/2009 |
| WO | 2011016867 | 2/2011 |

OTHER PUBLICATIONS

European Search Report and Opinion issued in connection with corresponding EP Application No. 13197702.7 on May 14, 2014.

* cited by examiner

*Primary Examiner* — Paul Yanchus, III
(74) *Attorney, Agent, or Firm* — Parks Wood LLC; Stephen J. Terrell

(57) ABSTRACT

A system includes a utility meter. The utility meter includes a network interface and a processor. The processor is configured to determine whether the network interface is operational subsequent to a bootup of the utility meter. The processor is also configured to initiate a reboot of the utility meter using known valid firmware instruction set of the utility meter if the network interface is determined to be non-operational.

16 Claims, 2 Drawing Sheets

FIRMWARE UPGRADE ERROR DETECTION AND AUTOMATIC ROLLBACK

BACKGROUND

The subject matter disclosed herein relates to microprocessor based smart utility meters, and more particularly to methods and systems for the automatic detection of firmware update errors during deployment of firmware on an advanced metering infrastructure.

In microprocessor-based utility meters, or smart meters, a majority of metering functionality is implemented in firmware. In general, the firmware of a system is the software that is stored in read-only memory and contains routines such as the start up routines and low-level input/output routines. In the lifetime of a microprocessor-based smart utility meter, new versions of firmware may be released to fix bugs, add new features, enhance functionality, etc. Utility companies can update smart meter firmware over an advanced metering infrastructure (AMI) network by designating an AMI host to send smart meter firmware update data to a plurality of smart meters on the AMI network. Generally, after a smart meter receives an update and boots up, it performs self-tests and logs errors that may have occurred during the update process. An AMI host receives the error information and, depending on the severity of the errors, may send a command to the meter to rollback and to reboot itself with an old firmware image, for example, when the new firmware update is unsuccessful. However, the firmware running on the microprocessor of a smart meter may also define the meter's AMI communication functionality. Thus, if an error occurs in the firmware update that would inhibit a meter's AMI functionality, a meter may not be able to send error information to a host or receive the rollback command from the host, resulting in the corrupted firmware remaining present on the meter.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a utility meter. The utility meter includes a network interface and a processor configured to determine whether the network interface is operational subsequent to a bootup of the utility meter, wherein the processor is configured to reboot the utility meter using known valid firmware instruction set of the utility meter if the network interface is determined to be non-operational.

A second embodiment includes a non-transitory computer-readable medium having computer executable code stored thereon. The code includes instructions for initiating a bootup of a utility meter, determining whether a network interface in a utility meter is operational subsequent to the bootup of the utility meter, and rebooting the utility meter using known valid firmware instruction set of the utility meter if the network interface is determined to be non-operational.

In a third embodiment, a utility meter includes a memory configured to store a known valid firmware instruction set of the utility meter received at a first time, and a processor configured to boot the utility meter based on a firmware instruction set of the utility meter received at a second time, determine whether the boot is successful, and reboot the utility meter utilizing the known valid firmware instruction set if the boot is determined to be non-successful.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
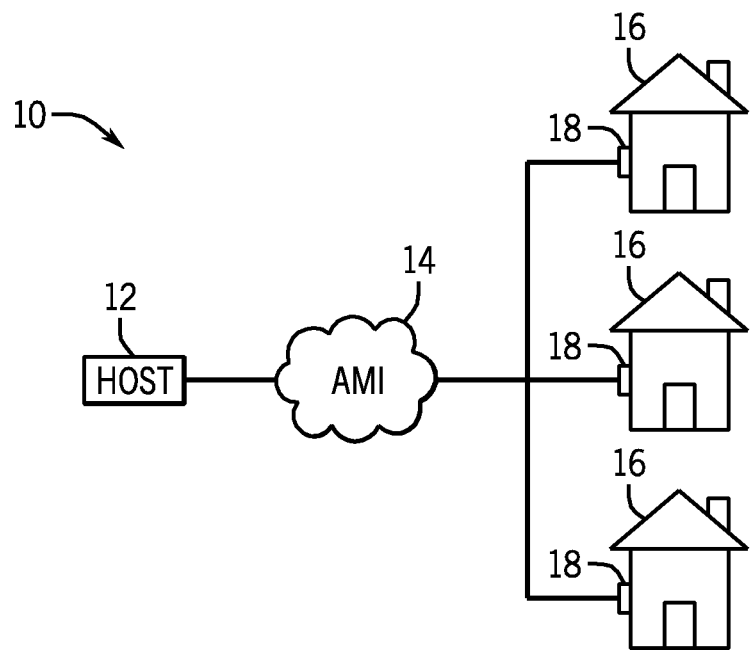
FIG. 1 is a system-level diagram of a utility network with smart meters connected to an AMI network.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In the lifetime of a microprocessor based smart meter, a utility company may develop firmware updates that may fix bugs, add new features, enhance functionality, etc. Utility companies may update smart meter firmware remotely over an advanced metering infrastructure (AMI) network by designating an AMI host to send firmware update data to a plurality of smart meters. Generally, after a meter receives a firmware update and boots up, it may perform self-tests and log errors that may have occurred in the update process. The smart meter may send the error information back to the AMI host. Depending on the severity of the errors, the host may send a command back to the smart meter to rollback and reboot itself with an old firmware image. However, the firmware running on the microprocessor of a smart meter also defines a meter's AMI functionality. If an error occurs in the firmware update that would inhibit a meter's AMI functionality, a meter may not be able to send error information to a host or receive the rollback command from the host, leaving the corrupted firmware on the meter.

Accordingly, present embodiments relate to techniques and systems for a smart meter to automatically rollback to an old firmware image after new firmware is launched and AMI functionality of the meter or other functionalities of the meter fail. Therefore the present embodiment provides a more reliable system for remotely updating smart meter firmware. In certain embodiments, the meter may record communication times, communication intervals, bootup times, bootup intervals, or a combination thereof, and use the recorded times to determine if the smart meter should roll the firmware back to a previous version. More specifically, after rebooting with new firmware, the smart meter may start a timer that records how much time has elapsed since rebooting. The smart meter may determine if the timer has exceeded predetermined thresholds based on the recorded communication and bootup times to determine if the smart utility meter should roll back to a previous firmware version. In certain embodiments, the smart utility meter may set thresholds based on the communication intervals and bootup times. After rebooting, if a smart utility meter hasn't received a communication signal for a time exceeding the threshold, the smart utility meter may roll back to a previous version of firmware. Additionally, when a new firmware version is installed, the smart meter may perform tests, log any errors that may be determined, and transmit the errors to hosts on the utility meter's network.

With the foregoing in mind, it may be useful to describe an embodiment of the outage detection system, such as the system illustrated in FIG. 1. As depicted, the AMI network system 10 may include one or more host units 12 that are connected to an AMI network 14 and designed to provide oversight operations of the AMI network system 10. Each host unit 12 in the AMI network system 10 may include processors and/or other data processing circuitry that may be operably coupled to a storage and a memory to execute instructions for carrying out a variety of oversight operations of other utilities in the AMI network system 10. For example, in certain embodiments, each host unit 12 may be a utility control center. In addition to sending commands and data to other utilities in the AMI network system 10, utility control centers may provide oversight operations of a smart grid system, such as monitoring and directing power produced by one or more power generation stations. In other embodiments, the utility control centers may report data about the AMI network system 10 to external sources such as operation centers or other hosts of other AMI networks.

In addition to host units 12, the AMI network system 10 may include customer residences 16 that include utility meters 18. Utility meters 18 may be located on commercial buildings, apartment residences, or any other entity that is connected to a utility network. The host unit 12 may issue commands or send data such as firmware updates to a plurality of utility meters 18. A host unit 12 may also receive data such as firmware error information from a plurality of utility meters 18. In certain embodiments, the host unit 12 may include a table in storage to maintain status information of the utility meters 18 connected to the AMI network 14. The host unit 12 may monitor the table to monitor the status of each utility meter 18, determine which utility meters 18 require updates, and determine if a utility meter 18 firmware update has failed. The host unit 12 may additionally maintain records of past failure and error information of the utility meters 18, and utilize the data to determine if a utility meter 18 is faulty.

Figure 2:
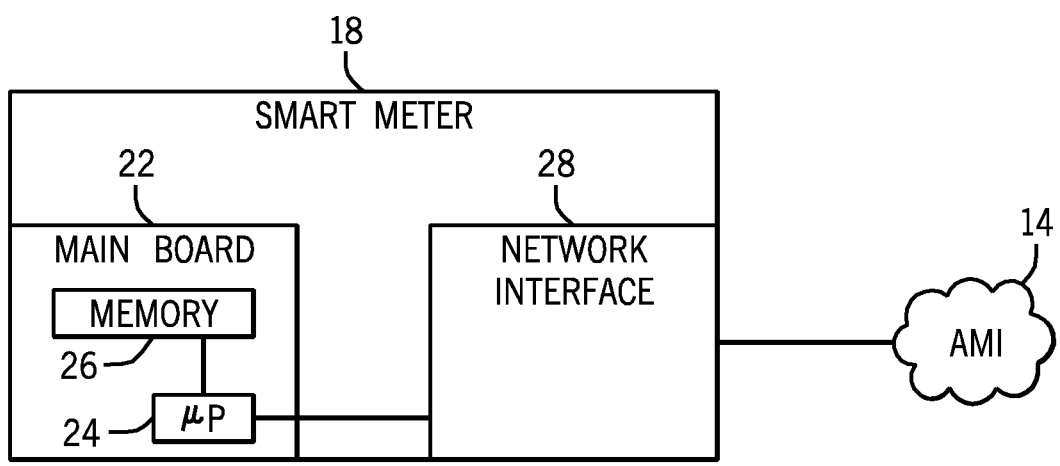
FIG. 2 is a detailed diagram of a smart meter of FIG. 1 connected to an AMI network.
Figure 3:
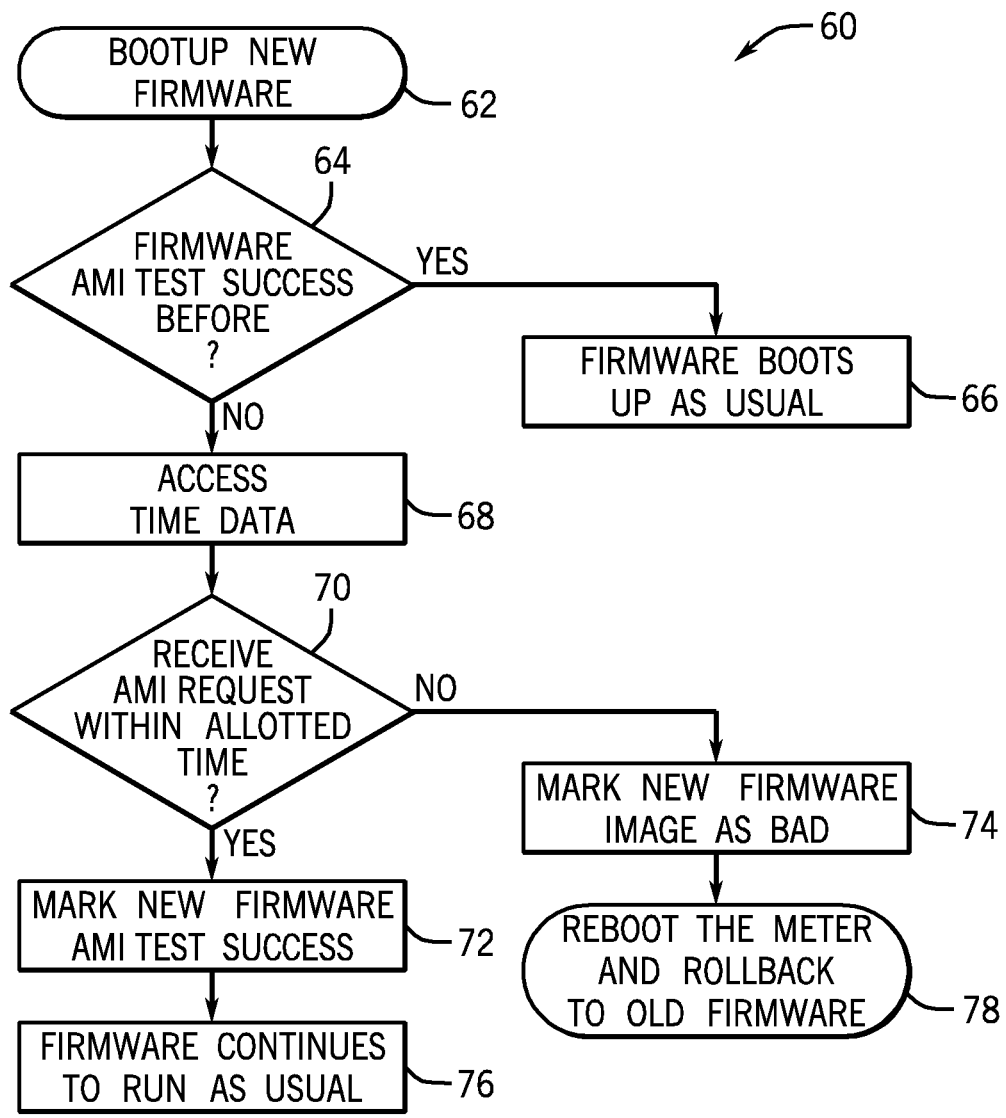
FIG. 3 is a flowchart of a method for detecting corrupted firmware on a smart meter, such as the smart meter of FIGS. 1 and 2.

Moving from a system level to a specific component, further detail of the hardware of a utility meter 18 is illustrated in FIG. 2. In the embodiments illustrated in FIGS. 1 and 2, the utility meter 18 is a smart meter. Smart meters may record the consumption of electrical energy, report energy consumption values back to host units 12 on the AMI network 14, and receive data and commands from hosts on the AMI network 14. The utility meter 18 of FIG. 2 includes a main board 22 and a network interface 28. The main board 22 includes a microprocessor 24 and a memory 26 and may include other components typical of a microcontroller or embedded system. The microprocessor 24 may execute instructions to carry out the operation of the smart meter 18. These instructions may be encoded in programs or code stored in a tangible non-transitory computer-readable medium, such as the memory 26 and/or other storage. To enable communication over the AMI network 14, the microprocessor 24 may be connected to a network interface 28. The network interface 28 may allow the microprocessor to communicate over the AMI network 14. The network interface 28 may send error information and receive firmware update data over the AMI network 14 and communicate with the microprocessor 24 to record time stamps and time intervals between communications over the AMI network 14 as mentioned above. The time data may be stored in the memory 26 of the utility meter 18 in any appropriate data structure such as a table, an array, a linked list, specified registers, variables, or a combination thereof. The microprocessor 24 of the utility meter 18 may use the time interval information to determine errors and failure of the firmware update of the utility meter 18. Additionally, the memory 26 may contain instructions Turning now to FIG. 3, a flowchart 60 depicts steps that the instructions stored in the memory 26 of the utility meter 18 may specify for detecting corrupted firmware on a smart meter. After receiving new firmware over the AMI network 14, a utility meter 18 may reboot with the new firmware, as represented by block 62. In other embodiments, such as when a hardware or software fault or other error occurs, the utility meter 18 may also reboot without receiving new firmware. After booting up, the utility meter 18 may determine if the current firmware has successfully passed an AMI test before, as represented by block 64. If so, the firmware may boot up as usual, as represented by block 66.

If the current firmware has not successfully passed an AMI test before, the utility meter 18 may conduct an AMI test. In the AMI test, the utility meter 18 may access time data, as represented by block 68. In certain embodiments, the time data may include a bootup time ($T_b$) of the new firmware, if new firmware is being installed. The bootup time of the new firmware may be stored in the memory 26 of the smart meter 18, or may be included in an AMI message sent by a host 12. In certain embodiments, the microprocessor 24 may calculate each AMI communication interval and record the maximum interval time ($T_{max}$). Additionally, in other embodiments, the microprocessor 24 may record the time of the last AMI communication time ($T_1$). As mentioned above, the time data may be stored in the memory 26 of the utility meter 18 in any appropriate data structure.

As represented by block 70, the smart meter may determine whether or not it has received an AMI communication request within an allotted amount of time. In certain embodiments, the allotted amount of time may be m*($T_b$-$T_1$), where m may be a positive integer. The value of m may be chosen to provide extra time in the case that an AMI communication request signal is dropped or corrupted. In general, a larger value of m may improve the reliability that a reboot is necessary. However, a very large value of m may delay a timely reboot from occurring. In other embodiments, the allotted amount of time is n*$T_{max}$, where n may be a positive integer. As with the value of m, n may be chosen in a way so that the system will reliably detect faults without causing unnecessary delays. In further other embodiments, the allotted amount of time is max(m*($T_b$-$T_1$), n*$T_{max}$), or in other words, the larger allotted amount of time of the previous two embodiments. Combining the allotted times may make the error detection and rollback more reliable. Other embodiments may record other pieces of time data and use different thresholds for determining when rollback should occur.

If the utility meter 18 does not receive an AMI communication request within the allotted times mentioned above, the utility meter 18 may mark the new firmware image as bad, reboot the meter, and rollback to old firmware, as represented by blocks 74 and 78 respectively. Alternatively, if the utility meter 18 does receive an AMI communication request within the allotted time, the smart meter may mark the new firmware as successfully passing the AMI test and may continue to run the firmware as usual, as represented by blocks 72 and 76.

Technical effects of embodiments include a method for detecting firmware update errors in a smart utility meter. In certain implementations, the method includes calculating AMI communication intervals and recording the maximum interval time ($T_{max}$). The smart meter also records the time of the last AMI communication ($T_1$) and accesses the bootup time ($T_b$) of the new firmware. After rebooting the new firmware, the smart meter waits to receive an AMI communication request for an allotted amount of time. The allotted amount of time may be $m*(T_b-T_1)$, $n*T_{max}$, or $\max(m*(T_b-T_1), n*T_{max})$. A microprocessor on the utility meter uses the timing information to determine if the firmware failed to install correctly and requires a reboot and rollback.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a utility meter, comprising:
a network interface;
a processor; and
a memory comprising instructions that, when executed by the processor, cause the processor to:
initiate a bootup of the utility meter using an upgraded firmware instruction set, wherein the bootup is associated with a bootup time;
calculate a time interval based on a first time, wherein a communication signal is received at the network interface at the first time;
determine whether the network interface is operational subsequent the bootup of the utility meter, wherein the network interface is determined to be non-operational if a communication signal is not received at the network interface within the time interval after the bootup time;
initiate a reboot of the utility meter using known valid firmware instruction set if the network interface is determined to be non-operational.

2. The system of claim 1, wherein the network interface is configured to receive data comprising the upgraded firmware instruction set.

3. The system of claim 1, wherein the memory stores the known valid firmware instruction set.

4. The system of claim 1, wherein the first time is associated with a last communication signal that is received by the network interface.

5. The system of claim 4, wherein the time interval is further calculated based on a second time, wherein the second time is the bootup time.

6. The system of claim 1, wherein the time interval is a maximum one of time intervals between two consecutively received communication signals, wherein one of the two consecutively received communication signals of the maximum time interval is the communication signal that is received at the first time.

7. The system of claim 5, wherein the time interval is calculated as a multiple of a difference between the second time and the first time.

8. The system of claim 6, wherein the time interval is calculated as a multiple of the maximum time interval.

9. The system of claim 7, wherein the time interval is calculated as a larger value between:
a multiple of a difference between the second time instance and the first time instance; and
a multiple of a maximum one of time intervals between two consecutively received communication signals.

10. A non-transitory computer-readable medium comprising instructions that, when executed by a processor, cause the processor to:
initiate a bootup of a utility meter using an updated firmware instruction set, wherein the bootup is associated with a bootup time;
calculate a time interval based on a first time, wherein a communication signal is received at a network interface of the utility meter at the first time;
determine whether the network interface is operational subsequent to the bootup of the utility meter, wherein the network interface is determined to be non-operational if a communication request is not received at the network interface within the time interval after the bootup time; and
initiate a reboot the utility meter using a known valid firmware instruction set if the network interface is determined to be non-operational.

11. The non-transitory computer readable medium of claim 10, wherein the first time is a time at which a last communication signal is received by the network interface.

12. The non-transitory computer readable medium of claim 11, wherein the time interval is further calculated based on a second time, wherein the second time is the bootup time.

13. The non-transitory computer readable medium of claim 12, wherein the time interval is calculated as a multiple of a difference between the second time and the first time.

14. The non-transitory computer readable medium of claim 12, wherein the time interval is calculated as a larger value between:
a multiple of a difference between the second time instance and the first time instance; and
a multiple of a maximum one of time intervals between two consecutively received communication signals.

15. The non-transitory computer readable medium of claim 10, wherein the time interval is a maximum one of time intervals between two consecutively received communication signals, wherein one of the two consecutively received communication signals of the maximum time interval is the communication signal that is received at the first time.

16. The non-transitory computer readable medium of claim 15, wherein the time interval is calculated as a multiple of the maximum time interval.

* * * * *